United States Patent [19]

Hussey et al.

[11] Patent Number: 5,773,810
[45] Date of Patent: Jun. 30, 1998

[54] METHOD FOR GENERATING REAL TIME DEGREE OF FOCUS SIGNAL FOR HANDHELD IMAGING DEVICE

[75] Inventors: Robert M. Hussey, Liverpool; Andrew Longacre, Jr., Skaneateles, both of N.Y.

[73] Assignee: Welch Allyn, Inc., Skaneateles Falls, N.Y.

[21] Appl. No.: 625,111

[22] Filed: Mar. 29, 1996

[51] Int. Cl.$^6$ .................................................. G06K 7/10
[52] U.S. Cl. ...................... 235/472; 250/201.7; 235/462
[58] Field of Search ................................. 235/462, 472, 235/454; 250/201.7

[56] References Cited

U.S. PATENT DOCUMENTS

| | | | |
|---|---|---|---|
| 4,578,571 | 3/1986 | Williams | 235/472 |
| 4,818,886 | 4/1989 | Drucker | 235/462 |
| 4,831,275 | 5/1989 | Drucker | 235/462 |
| 4,877,949 | 10/1989 | Daneilson et al. | 235/462 |
| 4,920,255 | 4/1990 | Gabeler | 235/472 |
| 5,003,165 | 3/1991 | Sarfati et al. | 250/201.7 |
| 5,420,409 | 5/1995 | Longacre, Jr. et al. | 235/462 |

*Primary Examiner*—F. L. Evans
*Attorney, Agent, or Firm*—Wall Marjama & Bilinski

[57] ABSTRACT

A method for generating, substantially in real time, a user perceptible indication of the degree to which the distance between a handheld imaging device and a target object approximates the in-focus distance therebetween. A stored image of the target object is sampled, in accordance with a pattern of sampling addresses, to determine the magnitude of the slopes of the transitions of the stored image. The stored image is also sampled to determine the contrast value of the stored image. The highest magnitude slope values and the image contrast value are combined to produce a focus metric signal that is indicative of the degree to which the imaging device approximates an in-focus condition. The focus metric signal is then used to generate a user perceptible signal that can be utilized by an operator to move the imaging device toward its in-focus distance.

50 Claims, 5 Drawing Sheets

METHOD FOR GENERATING REAL TIME DEGREE OF FOCUS SIGNAL FOR HANDHELD IMAGING DEVICE

BACKGROUND OF THE INVENTION

The present invention relates to handheld imaging devices, including but not limited to bar code readers, and is directed more particularly to a method for generating, substantially in real time, a user perceptible feedback signal for facilitating the manual positioning of the imaging device at a distance that corresponds to the focal length thereof.

Handheld imaging devices such as bar code readers, optical character readers, digital cameras, and the like have come into widespread use in large numbers of retail, industrial and medical applications. Such imaging devices are used to perform routine data entry functions, such as pricing, inventory updating, etc., with an accuracy and reliability that far exceeds the accuracy and reliability of manual data entry. These and other advantages, such as high data throughput rates and direct compatibility with data processing devices and systems, assures that imaging devices will be used to read ever increasing quantities and densities of optically encoded data.

In accommodating the need for these increasing quantities and densities of data, two-dimensional (2D) matrix symbologies, such as MaxiCode, and stacked symbologies, such as PDF417 and Code 49, have been developed to take advantage of the higher information per unit area and powerful error correcting capabilities thereof. 2D solid state image sensors, such as CCD image sensors, are able to receive and convert into electrical signals images which optically encode data in two mutually perpendicular directions. Provided that these image sensors are provided with optical imaging systems that provide properly exposed and sharply focused images of their target objects or symbols, and with signal processors that include suitable decoding software, these image sensors are able to read data from various types and in many shapes and sizes of bar code and other symbols.

When one or both of the exposure time and focus of an image sensor do not have their optimum values, the associated reader will fail to realize its full potential. In the case of exposure time, this failure manifests itself as images which are too bright (overexposed) or too dark (underexposed) to provide the signal contrast necessary for a high signal-to-noise ratio. In the case of focus, this failure manifests itself as images which lack the high resolution or sharpness necessary for the device to distinguish between densely packed image data elements.

Prior to the present invention, many different attempts have been made to solve the above-mentioned problems. In the case of exposure time, these attempts have usually involved the inclusion of an automatic exposure control circuit or program which measures the light intensity at the target symbol and adjusts the exposure time of the image sensor as necessary to achieve a predetermined target value for the peak-to-peak output voltage thereof. An example of a hardware approach to automatic exposure control is described in U.S. Pat. No. 4,538,060 (Sakai et al). An example of a software approach to automatic exposure control is described in copending, commonly assigned U.S. patent application Ser. No. 08/574,386, filed Dec. 18, 1995.

In the case of focus, the methods used to achieve an acceptable degree of focus prior to the present invention have involved the measurement of the distance between the reader and its target, and the use of this measurement to adjust the focal length of an adjustable lens assembly. Focusing systems of this type may be classified on the basis of differences between the devices that are used to measure distance and/or the devices that are used to adjust the focal length of the lens assembly.

An example of a focusing system that uses an ultrasonic transducer to measure distance is described in U.S. Pat. No. 4,920,255 (Gabeler). An example of a focusing system that uses the position of a spotter beam to measure distance is described in U.S. Pat. No. 5,378,883 (Batterman, et al). An example of a focusing system that uses a lens assembly having a mechanically adjustable focal length includes U.S. Pat. No. 4,877,949 (Danielson, et al).

Another approach to achieving an acceptable degree of focus is to use a reader having a fixed focal length and to take advantage of the ability of the operator to recognize a distance which is equal to that focal length. Since, in most cases, readers are not equipped with displays that provide their operators with images of the field of view thereof, the ability of an operator to recognize the proper distance must be learned from experience. In readers that are not equipped with such displays, the gaining of this experience may be accelerated by providing the operator with an audible feedback signal which indicates when the target symbol is at a distance that is close enough to its fixed focal length that the target symbol may be successfully read and decoded. In such readers the feedback signal is produced by a beeper which beeps when a symbol has been successfully decoded.

Prior to the present invention, readers of the above-mentioned feedback type have had a number of deficiencies which limit their usefulness. One of these is that the feedback signal is not instantaneous. With 2D bar code symbols, for example, the decode time may be on the order of 400 ms or more, a time which is sufficiently long that the user/operator may have difficulty correlating the focal length of the reader with the distance which resulted in a successful decode.

Another of these deficiencies is that readers with a fixed focal length have a depth of field which is designed to be as large as possible. As a result, so long as symbols are successfully decoded, the user is not provided with any guidance as to whether the reader-to-target distance was optimal or barely sufficient. This, in turn, can prolong the time required for the user to learn exactly which reader-to-target distance corresponds to the optimal in-focus condition of the reader.

While the effect of these deficiencies can be reduced by incorporating distance measuring devices, such as ultrasonic transducers, proximity detecting circuits, etc., the incorporation of these devices and/or circuits can substantially increase the cost of the reader, as well as reducing its mechanical reliability. In addition, the small amount of space available within hand held imaging devices may make the incorporation of such devices or circuits more difficult.

In view of the foregoing, it will be seen that, prior to the present invention, there has existed a need for a method for generating a user perceptible degree of focus feedback signal which is not subject to the foregoing deficiencies. It will also be seen that there has existed a need for an improved method for automatic exposure control which is not subject to the foregoing deficiencies.

SUMMARY OF THE INVENTION

In accordance with one feature of the present invention there is provided an improved method for generating a user perceptible degree of focus signal which is not subject to the deficiencies of previously known methods for generating such signals. More particularly, the present invention provides a method for generating a degree of focus signal which gives a substantially instantaneous indication of the degree to which the position of an optical reader or digital camera corresponds to the position at which the reader or camera is at its optimal focal distance.

Generally speaking, the method of the invention comprises the steps of taking and storing an image of a target object, symbol or character, sampling the stored image to derive therefrom a degree of focus signal having a magnitude that varies in accordance with the slopes of a predetermined number of the sharpest transitions of the stored image, comparing the magnitude of the degree of focus signal to a reference focus signal indicative of the degree of focus value that corresponds to the optimum in-focus distance of the reader, and generating, substantially instantaneously, a user perceptible signal that the user may use in establishing that in-focus distance. Because of the speed with which the feedback signal is generated, a user is able to make an apparently continuous guided adjustment of the distance between the reader and its target and to thereby rapidly converge on the distance that corresponds to an in-focus condition. This not only greatly decreases the time necessary to establish the in-focus condition, it also greatly decreases the time necessary for the operator to learn where to initially position the reader. This decrease in learning time is particularly important with optical readers that have a short depth of field.

One important advantage of the method of the invention is that it may be practiced without increasing the number of optical or electrical elements that are included in the reader with which it is used. This is because all of the circuit components necessary for the use of the method of the invention are already present. Stated differently, the method of the invention is implemented by changing the way that already present optical and electrical elements cooperate and interact, and not by changing their numbers or types. As will be explained more fully later, this is accomplished by changing the instructions included in the stored program of the reader. Thus, the present invention may be practiced without increasing either the cost or the amount of space occupied by the reader.

In generating the desired degree of focus signal, the method of the invention contemplates a sampling step in which proximately located pairs of image data elements are selected in accordance with a sampling pattern or grid that encompasses enough of the stored image data to assure that, without regard to the orientation between the reader and the target object, the sampling step produces a set of signal values that provide a representative indication of the sharpness of the transitions of the target object as a whole. Since the transitions of a printed target object may be assumed to be sharp, any lack of sharpness in the transitions of the stored image data representing the same may be assumed to be the result of an out of focus condition in the imaging process. As a result, the sampled sharpness values may be used as a direct measure of the degree of focus of the reader.

In accordance with another feature of the invention, the generation of the degree of focus signal includes the step of correcting or normalizing the sampled image data for the effect of image contrast. In particular, the sampling step of the invention includes the sampling of the image data to determine the gray scale whiteness values of the brightest and darkest image data elements sampled. These extreme whiteness values are then used, as an indication of overall image contrast, to correct or normalize the above-mentioned sharpness values for the effect of image contrast. This, in turn, allows the method of the invention to be used with target objects having a wide range of contrast values.

Advantageously, it has been found that, in the course of sampling the image data, the inclusion of a few additional instructions allows a whiteness distribution plot, such as a histogram, to be constructed for the parts of the image data which coincide with the sampling grid. The availability of this histogram, in turn, makes possible the generation of a whiteness signal that may be used as a direct measure of the light level at the target object. In accordance with an important feature of the present invention, the availability of this whiteness signal, in conjunction with the degree of focus signal, allows the focus and the exposure time of the reader to be adjusted substantially concurrently, as complementary parts of a single sampling and adjustment process. As in the case of the focusing feature of the invention, the exposure control feature of the invention is provided, not by including additional optical and electrical elements, but rather by making different and more effective use of already present optical and electrical elements.

Generally speaking, the exposure time control method of the invention includes the steps of determining, from the above-mentioned whiteness distribution, a whiteness signal value that is representative of the illumination level of the target as a whole and determining, from this measured whiteness value and a reference whiteness value, whether the difference therebetween exceeds predetermined acceptable limits. If the difference is within acceptable limits, no exposure time adjustment is made; if the difference is not within acceptable limits, the exposure time is adjusted in accordance with an adjustment process that is designed to result in an acceptable whiteness level within a relatively short time.

DESCRIPTION OF THE PREFERRED EMBODIMENTS

Figure 1:
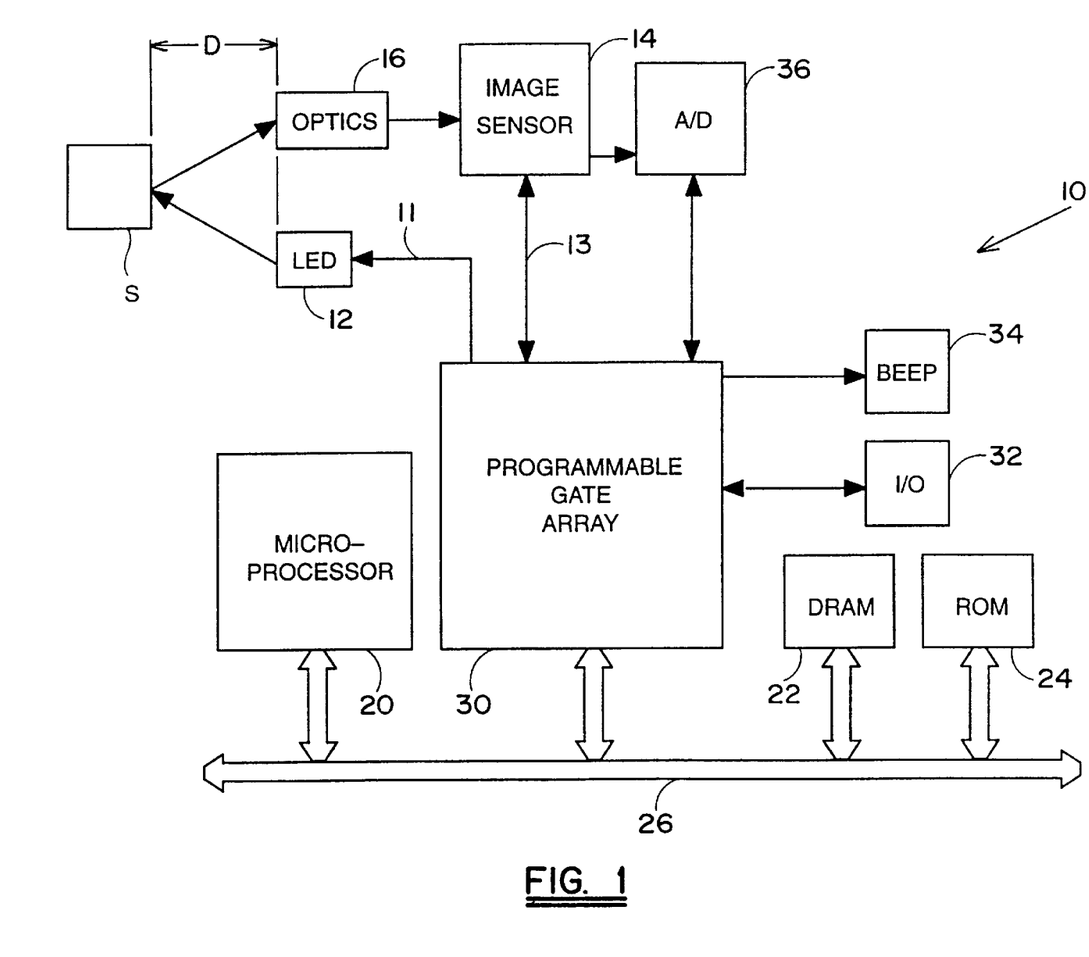
FIG. 1 is a block diagram of an optical reader suitable for use in practicing the method of the invention.

Referring to FIG. 1 there is shown a block diagram of one type of optical reader 10 that is suitable for use in practicing the method of the invention. This reader includes an illumination assembly 12 for illuminating a target object, such as a 2D bar code symbol S, and an imaging assembly 14 for receiving an image of the object, via an optical imaging assembly 16, and generating an electrical output signal indicative of the printed symbol and the data optically encoded therein. Illumination assembly 12 may, for example, comprise one or more LED's together with one or more reflectors for directing light in the direction of object S. Illumination assembly 12 may be eliminated if ambient light levels are high enough to allow high quality images to be taken. Imaging assembly 14 may comprise a 2D image sensor of any of a variety of types, such as a CCD or CMOS image sensor, and may in particular comprise a VVL-1060B image sensor of the type manufactured by VLSI Vision, Ltd.

Optical reader 10 of FIG. 1 also preferably includes a microprocessor 20, a dynamic random access data memory (DRAM 22), a ROM 24, and a bus 26 for communicating data, address and control signals therebetween. Optical reader 10 also preferably includes a programmable gate array or application specific integrated circuit (ASIC) containing specialized circuitry, such as frame DMA circuitry, for controlling the addressing and storage of image data in DRAM 22 so that microprocessor 20 can devote most of its time to tasks such as analyzing and decoding data stored in DRAM 22. Reader 10 also includes an I/O channel 32 through which it may communicate with external circuitry, such as a host processor (not shown), and a "beeper" or similar signaling device 34 for generating user perceptible signals for use by a human operator. In the preferred embodiment, all of the circuitry shown in FIG. 1 will be enclosed in a suitable housing (not shown) which is adapted to be held in a human hand.

In operation, ASIC 30 controls the operation of illuminating assembly 12 and imaging assembly 14, via control lines 11 and 13, under the overall control of microprocessor 20 which, in turn, operates under the control of a program stored in ROM 24. ASIC 30 also controls the operation of an A/D converter circuit 36 which converts the analog output signal of imaging assembly 14 into a digital form suitable for storage in DRAM 22. With the previously mentioned VVL-1060B image sensor, and an 8 bit A/D converter, the result will be a series of 8 bit words, or image data elements, each of which represents the 8 bit gray scale value for a respective pixel of image sensor 14. Thus, each 8 bit word output by A/D converter 36 specifies the whiteness or light intensity value of one pixel of sensor 14 by specifying which of 256 possible whiteness values is associated therewith.

The 8 bit image data words received from AID converter 36 are stored in data memory 22 in accordance with a storage scheme which assures that there is a one-to-one correspondence between a pixel of the image sensor and an address in data memory 22. In other words, the image data stored in data memory 22 takes the form of a memory mapped representation of the object of interest, each image data element comprising a gray scale value that represents the whiteness value thereof. With the above-mentioned image sensor, there will be a total of 768×574 of such image data elements for each imaged frame of the object of interest. This assures that the reader has a sufficiently high resolution to read bar code symbols and other indicia or characters of any of a variety of known sizes and types, provided that the distance D between the reader and its target is such that the image formed on sensor 14 is approximately in focus, and provided that the exposure time of the image sensor 14 is not too long or too short to assure good signal contrast.

In accordance with the present invention, there is provided a method of using an optical reader of the type shown in FIG. 1 that assures that acceptable degrees of focus and signal contrast are achieved and, moreover, are achieved without increasing the cost, complexity or size of the reader. In the preferred embodiment, this is accomplished by selecting a set of representative image data addresses and determining from the image data stored at those addresses, substantially in real time, signal values or metrics indicative of the degree of focus and the degree of whiteness of the image on image sensor 14. The degree of focus signal is then used to generate a user perceptible but non-obtrusive feedback signal, such as an audible tick, for use in helping a user in establishing the reader-object distance that is associated with an in-focus condition, and the degree of whiteness signal is used to adjust the exposure time of the image sensor as necessary to produce an acceptable whiteness value. Taken together, these steps assure the rapid availability of stored image data which has both an acceptable degree of focus and an acceptable signal contrast, and which can therefore be decoded more easily and rapidly than would otherwise be the case.

Figure 2:
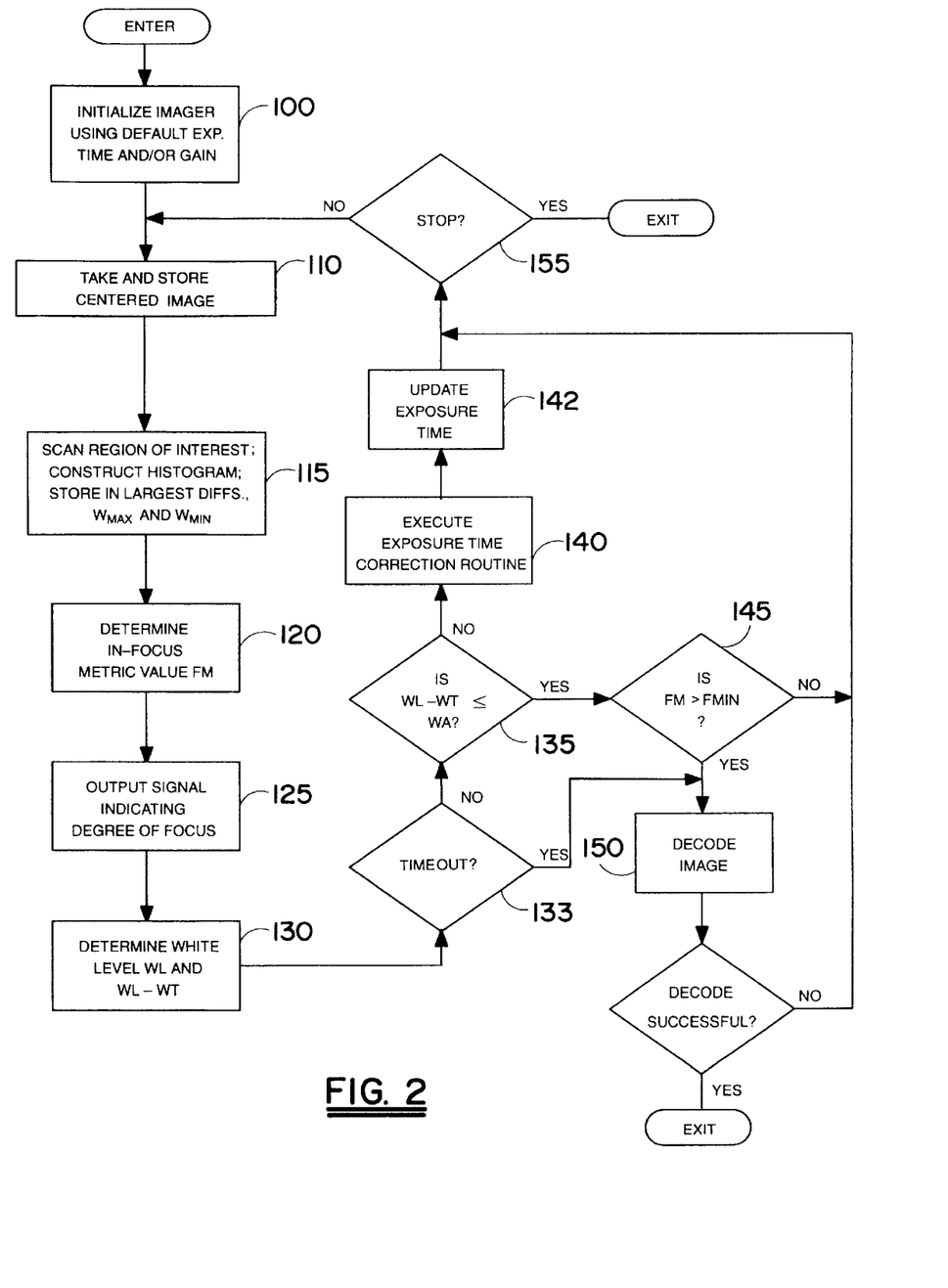
FIGS. 2 and 3 are flow charts which illustrate the operation of the method of the invention.
Figure 3:
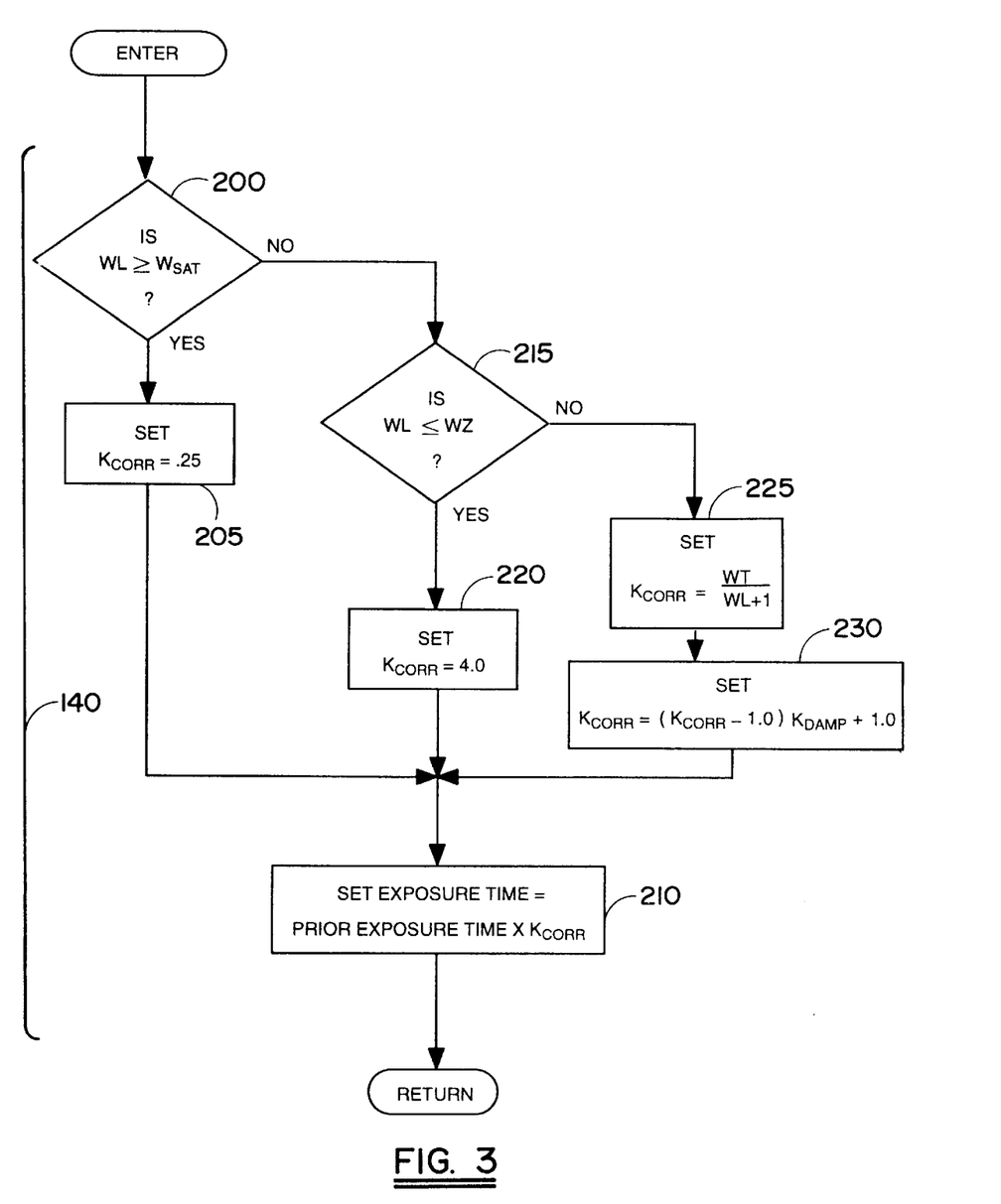

To the end that the above-summarized method may be practiced, the stored program of the reader of FIG. 1 includes instructions of the type shown in the flow charts of FIGS. 2 and 3. As will be explained more fully presently, the embodiment of FIGS. 2 and 3 is arranged so that the focusing and exposure adjusting phases of the method of the invention proceed concurrently and cooperatively, and so that no attempt is made to decode stored image data until acceptable results are achieved for both of these phases or, optionally, until a predetermined time has elapsed. In addition, the relationship between and sequence of the steps of the method is arranged so that a new set of image data is taken and is stored as soon as possible after it has been determined that an acceptable illumination level or an acceptable focus has not been achieved. Together, these features assure that the beginning of the decoding process is not delayed any more than is actually necessary to simultaneously satisfy the focus and illumination requirements of the reader.

Referring first to FIG. 2, the method of the invention begins with the step of initializing the reader, as called for by block 100. This block causes the initial exposure time and/or gain of image sensor 14 to be set to their default values, thereby allowing the reading process to begin. When this has been accomplished, the reader is instructed to take and store an image of the object of interest which is centered in the field of view thereof, as called for by block 110. The centering of the object of interest in the field of view is the responsibility of the user/operator, although the latter may find the feedback signal of the invention helpful in accomplishing this centering. Since the operations called for by blocks 100 and 110 are of a type known to those skilled in the art, they will not be described in detail herein.

The next steps of the method of the invention are those called for by block 115. These include, firstly, the establishment, for the selected region of interest, of a sampling grid or pattern that defines a set of addresses which allow that region to be sampled in systematic way, without addressing each image data element within the boundaries of that region. An exemplary one of such sampling patterns is shown in FIG. 5A as an array or grid 116 made up of seven rows R1, R2, etc. and 9 columns C1, C2, etc. which are mutually orthogonal to one another in address space. Because the orientation of the stored image with respect to this address space is at this time unknown, it is assumed not to bear any simple relationship to the orientation of grid 116. Because of the mutual orthogonality of the rows and columns, however, it may be assumed that any image features, such as black-white transitions, that are not easily readable with respect to the rows, will be easily readable with respect to the columns.

In the embodiment of FIG. 5A the rows and columns divide the interior of grid 116 into a plurality of square "blocks", each of which includes 48 sampling addresses. While these sampling addresses are known to have a one to one correspondence with the pixels of image sensor 14, they have no known relationship with respect to the transitions of the image of the object of interest. In other words, a set of samples that includes only data elements which have addresses that lie on grid 116 will provide a representative indication of the parameters of the image data even though most image data elements are not sampled.

This should not be understood, however, to mean that it is necessary to take a sample at each of the addresses that lie on the sampling grid. This is because the use of a less than a 100% sampling rate, e.g., the sampling of the data at every second, third or Nth available sampling address on the sampling grid, is highly likely to provide data which is as useful for purposes of the invention as the use of a 100% sampling rate. It will therefore be understood that the present invention is not restricted to the use of any specific sampling rate or density, or to the use of the same sampling rate for both focus and illumination level determinations. It will also be understood that the present invention is not restricted to the use of a sampling grid having any particular number rows and columns, or any particular configuration.

During the sampling of the selected region of interest the image data is arbitrarily addressed first on a row-at-a-time basis and then on a column-at-a-time basis until the entire sampling grid has been covered. In the preferred embodiment, the sampling necessary to produce the degree of focus metric of the invention may be performed at the same time as the sampling necessary to produce the whiteness metric of the invention. More particularly, as sampling proceeds, the reader is instructed to store, in data structures such as those shown as memory spaces MS1 and MS2 in FIGS. 5B and 5C, data indicative of the sharpness of the transitions of the stored image data. At substantially the same time the reader is instructed to construct a histogram, such as that shown in FIG. 6, in which there is stored, for each of the gray scale values encountered during sampling, a number equal to the number of times that value has occurred. As a result, at the conclusion of a sampling operation, the reader has stored all of the information it needs to determine the values of both the focus metric and the whiteness metric.

Figure 4A:
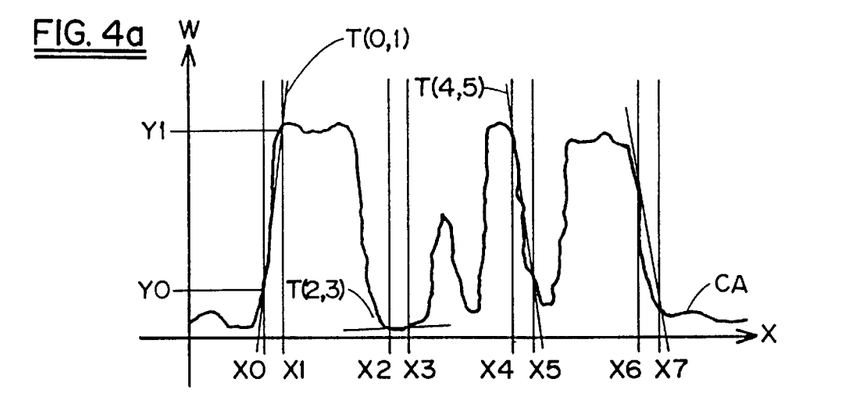
FIGS. 4A through 4C illustrate image data patterns of the type sampled by the method of the invention.
Figure 4B:
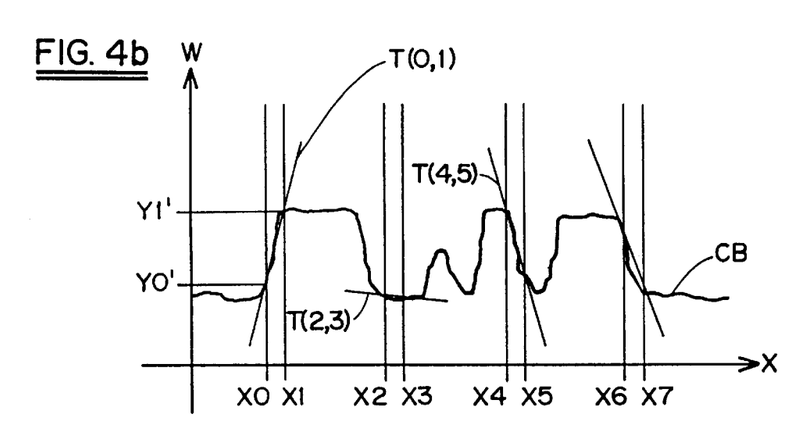
Figure 4C:
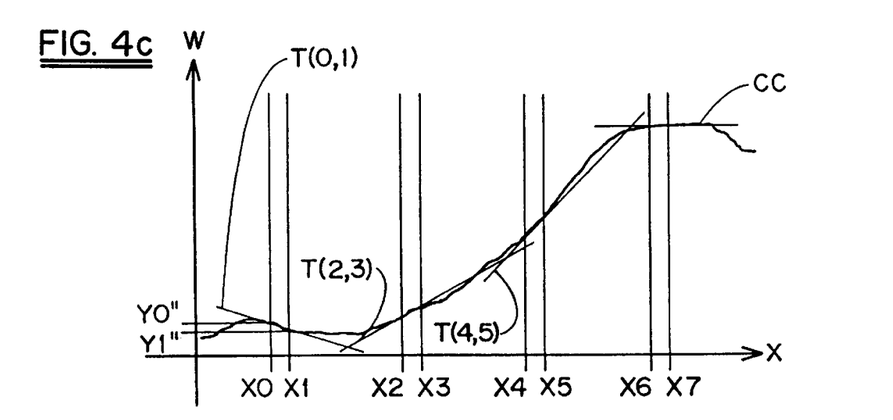
Figures 5, 5C:
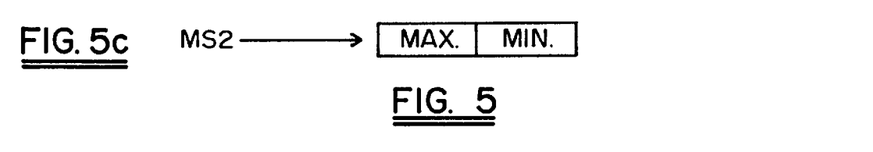
FIGS. 5A through 5C and 6 illustrate an exemplary sampling pattern and exemplary data structures that may be used in practicing the invention.
Figure 5A:
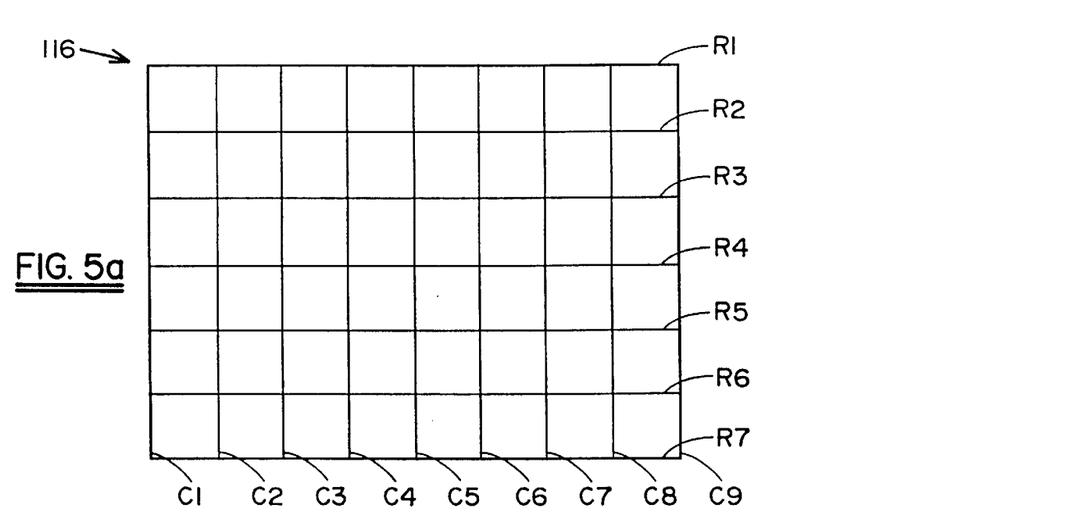
Figure 5B:
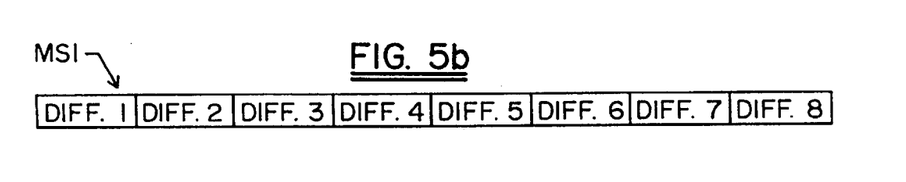

The manner in which sampled image data is used to determine the magnitude of the degree of focus metric is best understood with reference to the waveforms of FIGS. 4A through 4C and the data structures of FIGS. 5B and 5C. Referring first to FIGS. 4A–4C there are shown continuous whiteness curves CA, CB and CC which approximate the sequences of discrete gray scale values which are stored at the addresses indicated by the X axes of those Figures. (Whether these X axes correspond to the rows or columns of grid 116 is not important for present purposes). Also shown in FIGS. 4A–4C are pairs of addresses X0-X1, X2–X3, etc. which define the boundaries of the sampling intervals at which pairs of gray scale values are read from memory 22. These pairs of sampling addresses are preferably in proximity to one another in address space, although they are not necessarily immediately adjacent to one another. Stated differently, the sampling intervals are relatively narrow. In the preferred embodiment sampling address X1 is two address units greater than X0, although it might be as small as one unit greater or as large as N units greater, depending upon the particular application. Thus, the method of the invention is not limited to sampling intervals of any particular width.

For each pair of addresses sampled as shown in FIG. 4, there is produced a pair of values, such as Y0 and Y1, which specify the intensities or whiteness values of the addressed image data. If the sizes of all whiteness increments are equal, i.e., if a linear whiteness scale is used, the differences between whiteness values, such as Y1-Y0, divided by the differences between the associated X values, such as X1-X0, will result in numbers that are approximately indicative of the slopes or steepness values of the tangents to the whiteness curves at locations corresponding to respective sampling intervals. In FIG. 4 these tangents are labelled T (0,1), T (2,3), etc., to indicate the sampling intervals that are associated therewith. It will therefore be seen that the above-described sampling steps approximate the effect of taking the derivative of whiteness curves CA, CB and CC at a succession of sampling points. It will also be seen that, if all sampling intervals are of the same width, division by the differences between the X values becomes unnecessary since the differences in the Y values will themselves provide direct indications of the steepness or sharpness of the image data transitions.

Because the number of transitions of the image data and the number of difference values produced during sampling is relatively large, at least a substantial number of image data transitions will, by chance, coincide or otherwise be associated with particular ones of the sampling intervals. In the case of FIG. 4A, which shows image data for an image having high image contrast (i.e., high peak to peak values) and sharp image transitions, for example, transitions that occur during a sampling interval will be associated with high whiteness differences, such as Y1-Y0. In the case of FIG. 4C, which shows image data for an image having high image contrast but relatively less sharp image transitions, on the other hand, transitions that occur during a sampling interval will be associated with low whiteness differences, such as Y1"-Y0". Finally, in FIG. 4B, there is shown image data which is the same as that shown in FIG. 4A, but which has a lower image contrast value. Significantly, if the difference values for the image data of FIGS. 4A and 4B are each divided by the respective signal contrast values, the result will be difference or slope values that are normalized or corrected for the effect of signal contrast. This allows images which have sharp signal transitions to be distinguished from images which do not have such transitions, in spite of image contrast effects. Thus, the image data shown in FIGS. 4A and 4B both include transitions which qualify as sharp, while the image data shown in FIG. 4C does not include such transitions.

In view of the foregoing, it will be seen that sequences of samples that are taken along rows or columns that have sharp transitions are associated with high normalized slope values, while sequences of samples that are taken along rows or columns that lack sharp transitions are associated with low normalized slope values. In accordance with the present invention, this fact is utilized to generate, for a stored image of unknown orientation and distance, a measure of the degree of focus of that image which will hereinafter be referred to as a degree of focus signal or focus metric. In the preferred embodiment, this metric has a magnitude that reaches an extreme value (either maximum or minimum) when the distance between the target object and the reader is substantially at the distance corresponding to an in-focus condition, and that decreases as the distance between the target object and the image sensor deviates from that in-focus distance. With the present invention, the step of generating this degree of focus signal is performed in a way that makes it available for use substantially in real time, i.e., substantially as soon as data has been taken for all of the sampling intervals of the sampling grid. The generating step may therefore be followed, substantially instantaneously, by the step of generating a user perceptible feedback signal that allows the user to rapidly recognize and move the reader to its in-focus distance and thereby enable the reader to take and store a new image that is in or nearly in an optimally in-focus condition.

The manner in which the preferred embodiment of the present invention generates this focus metric is most easily understood with reference to the data structures MS1 and MS2 of FIGS. 5B and 5C, which data structures preferably comprise two sets of memory locations in data memory 22. The first of these data structures, MS1, comprises a set of eight 8 bit memory locations for storing the eight largest whiteness difference values DIFF1 through DIFF8 which are produced during the sampling of the image data in accordance with sampling grid 116. It will be understood that the number of difference values actually used is not critical since, in principle, even a single large difference value may be sufficient to determine if the image is in focus. The second of these data structures, MS2, comprises a set of two 8 bit memory locations MAX and MIN for storing the maximum and minimum whiteness values encountered during the sampling of the image data in accordance with sampling grid 116. The difference between these values are used to normalize the DIFF values for the effect of image contrast.

During operation, in accordance with block 115 of the flow chart of FIG. 2, early occurring low values for DIFF and MAX, are continuously replaced by later occurring high values therefor and early occurring high values for MIN are replaced by later occurring low values therefor until, at the end of the sampling process, only the respective highest and lowest values remain. As this is occurring, the reader also stores the data necessary to complete the histogram of FIG. 6. When this process is completed (i.e. when block 115 is exited), all of the information necessary to determine the focus and whiteness metrics of the stored image is then available and ready for immediate use.

As the processor executes the instructions called for by block 120, it determines, from the then available DIFF values, a composite DIFF value which is indicative of the sharpness of the transitions of the image data. It also determines, from the difference between the MAX and MIN values, a signal indicative of the signal contrast of the image data. Focus metric FM may then be calculated by dividing the magnitude of the former by the magnitude of the latter according to the following equation:

$$FM = \frac{256 \sum_i DIFFi}{MAX - MIN}$$

This division accomplishes the image contrast normalization mentioned earlier in connection with FIGS. 4A and 4B.

The multiplication of the DIFF value by 256, a procedure equivalent to eight shift left operations, is performed so that integer math can be used with less roundoff error. This multiplication need not have any effect on the ultimate in-focus determination, since a corresponding multiplication may be made in the maximum and minimum values that corresponds to an acceptable degree of focus. In a commercial version of the reader shown in FIG. 1 this calculation along with the calculation in block 115 of FIG. 2 may be performed in about 1 ms.

Once the focus metric value has been determined, the processor is directed to block 125 which causes it to generate an output or feedback signal having a user perceptible property that allows a user to judge the difference between the current reader-to-target distance and the reader-to-target distance that corresponds to an optimum in-focus condition. The simplest way in which to do this is to generate for application to beeper 34 an audio frequency signal, preferably a ticking signal, signal which has its maximum repetition rate or frequency when the reader is at its optimum in-focus distance and which decreases in ticking rate or frequency when the reader is moved in either direction away from this in-focus distance. If, for example, the audible signal has a ticking rate of 45 ticks/sec when the reader is at its optimum in-focus distance, the tick rate may fall further and further below 45 ticks/sec as the reader is moved further and further away from its in-focus distance in either direction. The same feedback effect may, of course, be achieved if the tick rate of the signal has a minimum value at the in-focus distance and increases as the reader-to-target distance deviates from that in-focus distance. Since audio sound generating subroutines capable of producing such output signals are known to those skilled in the art, these routines will not be described in detail herein.

Other signalling strategies may also be used provided that the in-focus distance, or at least an acceptably in-focus distance, is easily recognizable. One of these includes the generation of a two-state or pass-fail output signal, with one state indicating that an acceptable focus condition has been achieved and the other indicating that an acceptable focus condition has not been achieved. Another of these includes a switch between different types of sounds at the in-focus distance, with or without an intervening period of silence. Since audio sound generating subroutines capable of producing such output signals are known to those skilled in the art, these routines will also not be further described herein.

In noisy environments, where audible signalling is impractical, the real time feedback signal of the invention may also be provided by means of an visually perceptible signal, such as a blinking LED or LEDs. Such blinking may, for example, comprise the blinking of an already present good-read LED, or the blinking of the LEDs within illumination assembly 12. In such readers variations in the blink rate can be used in the same way as the earlier described variations in tick rate. Such a visual signal may use any of the above-described other signalling strategies, among others, including the well known barmeter. It will be understood that all such types of user perceptible feedback signals are within the contemplation of the present invention.

Since each stored image has only a single focus metric value, the above-discussed changes in repetition rate actually refer to the different focus metric values that are associated with different stored images that are taken at different respective reader-to-target distances. Thus, the above-described changes in sound actually occur as a user moves the reader closer and further from its target.

Because processors operate at frequencies which are much higher than audio frequencies, the reader may and preferably does proceed to the step called for by block 130 while the above mentioned feedback signal is being output. The feedback signal may, for example, be generated for a predetermined time period set by a suitable hardware or software timer within gate array 30.

Figure 6:
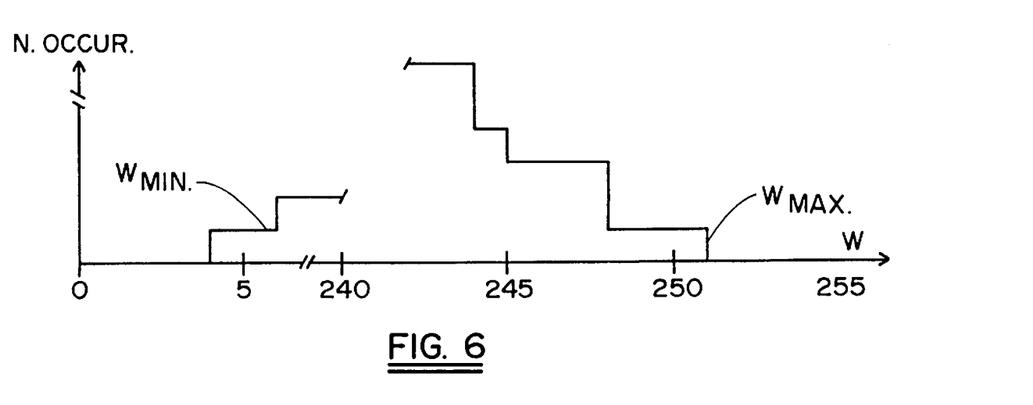

Pursuant to block 130, the reader determines, from the histogram shown in FIG. 6, the magnitude of a whiteness level signal that is indicative of the overall level of illumination at image sensor 14. In the preferred embodiment, this is accomplished by integrating the whiteness values of the histogram to determine the whiteness level corresponding to 93.75% (100%−6.25%) of the area thereunder, a value chosen because of its facilitation of the use of integer math. This whiteness level is designated WL in FIG. 2. Other definitions of whiteness level based, for example, on the standard deviation of the whiteness distribution may also be used, however, as may other methods for calculating the value thereof. The important thing is that the magnitude of whiteness level WL be derived from the measured distribution of light from the target object as a whole and be reasonably representative thereof, i.e., not be dominated by a few anomalously bright or dark pixels. Whiteness level WL preferably has a target whiteness value WT subtracted therefrom, the difference being expressed as an absolute value [WL−WT]. This allows the magnitude of the difference to be compared to an acceptable whiteness difference value WA, as will be explained presently in connection with block 135. Assuming, for example, the target white value WT is 140 (of 256), whiteness level WL may be found acceptable if the absolute magnitude of the difference therebetween is less than 4, i.e., is between 136 and 144. The latter values represent the maximum and minimum acceptable whiteness values for WL and may, of course, be specified directly, i.e., without using target and difference variables WT and WA. It will be understood that these two ways of evaluating whiteness are equivalent for purposes of the present invention.

Once the focus metric has been determined per block 120 and the whiteness metric has been determined per block 130, the reader is able to immediately determine whether the stored image data is sufficiently close to being in an optimally decodable form that decoding should be initiated. This condition is desirable because, as explained earlier, one of the objectives of the method of the invention is to skip time consuming decoding operations when the image data is marginally decodable as a result of a condition of sub-optimal focus and/or a condition of sub-optimal exposure time.

In keeping with these objectives, the completion of the steps called for by blocks 120 and 130 is followed by the performance of two image acceptability tests, both of which must be passed before decoding is initiated, unless there has elapsed the predetermined time (designated TIMEOUT) called for by block 133, as will be explained later. The first of these acceptability tests is made by block 135, which calls for the reader to determine if the absolute magnitude of the difference between whiteness level WL and whiteness threshold WT is less than a whiteness acceptability threshold WA. If it is not, the test is failed and the reader is known to have a whiteness that is not between acceptable maximum and minimum values. Under this condition, the reader is directed to an exposure time adjustment subroutine 140 which will be described later in connection with the flow chart of FIG. 3. If it is, the test is passed the reader is known to have an acceptable whiteness value. Under this condition, exposure time subroutine 140 is not performed.

If the reader has an acceptable whiteness value, it is directed to block 145 to determine if it also has an acceptable degree of focus. This is preferably accomplished by determining via block 145 whether focus metric value FM has a value greater than a focus acceptability threshold value, FMIN, that corresponds to the minimum acceptable value thereof. This is the preferred test because there is no upper limit on the quality of focus, and because the units used to apply the test are not important.

If this test is passed, the reader is directed to immediately attempt to decode the image, as called for by block 150. If it is not, the test is failed and the reader is directed back to block 155, which calls for the taking and storing of a new set of image data, unless the read process is to be stopped as, for example, by the release of the reader's trigger. No attempt is made to adjust the position of lens assembly 16 or otherwise compensate for an out of focus condition. This is because all focus adjustments are made manually by the operator, guided by the real time feedback signal generated by the action of block 125.

In view of the foregoing, it will be seen that, substantially immediately after the above-described focus metric and whiteness metric determinations are completed, the reader will be either decoding a set of image data that is known to be within acceptable illumination and focusing limits, or will be taking a new set of image data. In accordance with the invention, these limits are selected so that they exclude images which may actually be decodable, but which are only marginally so. This reflects the discovery that, over the course of many read operations, the total data throughput, or number of successful read operations per unit time, is greater if marginally decodable images, are skipped over in favor of more optimally decodable images than if they are not. The reason is that image decoding takes so much longer than image acquisition and storage that increasing the rate of successful decodings saves an amount of time that more than offsets the additional time necessary to acquire and store additional images.

The preferred embodiment of the invention includes previously mentioned additional block 133. This block precedes whiteness and focus blocks 135 and 145 and directs the reader to skip these blocks, if more than a predetermined time has passed since the first image of a particular sequence of images was taken. By skipping these blocks, the reader is allowed to attempt to decode the stored image, without regard to its whiteness and focus values, if the meeting of the acceptability tests takes longer than anticipated. This is desirable because, if meeting the acceptability tests takes too much time, for example, as a result of unusual operating conditions, it may actually take less time to proceed with a potentially marginally decodable symbol than to continue to attempt to achieve an optimally decodable symbol.

In order to realize the full benefit of the above-discussed time savings, it is desirable that the focus and whiteness evaluation process take place in the shortest possible time, preferably within 1 ms. One feature of the method of the invention which contributes to the shortening of this time is the already described sampling procedure. One reason is that sampling pattern 116 permits an image to be analyzed with reference to only a small fraction of the total number of stored image data elements. Another reason is that it is not necessary to take samples for all of the sampling intervals that are made possible by grid 116. In FIGS. 4A through 4C, for example, only approximately one in each eight possible sampling intervals is actually used, e.g., sampling intervals X0-X1 is approximately one fourth as large as non sampling interval X2-X1. The illustrated sampling rate or density is therefore equal to approximately 0.125. It will be understood, however, that the present invention is not limited to any particular sampling rate.

Another feature of the present invention which contributes to the rapid completion of the image acquisition process is the use of the rapidly executable exposure time adjustment subroutine which will now be described with reference to the flow chart of FIG. 3. As will be explained more fully presently, this subroutine serves to determine the magnitude of the correction coefficient $K_{CORR}$ by which the last used exposure time will be multiplied to yield a new value for the exposure time.

On first entering the routine of FIG. 3, the reader is first directed to determine, per block 200, whether whiteness level WL is greater than or equal to the saturation whiteness level WSAT of image sensor 16. If it is, then it is known that the current value of WL is not usable as a basis for future adjustments. Under this condition, correction coefficient $K_{CORR}$ is set equal to 0.25, per block 205, to assure that, upon exiting routine 140 via through block 210, the next image is acquired with a substantially reduced exposure time. If it is not, the reader is directed to block 215, which causes the reader to determine if whiteness level WL is less than or equal to an acceptable zero whiteness level WZ. If it is, it is again known that WL is not usable as a basis for further adjustments. Under this condition, $K_{CORR}$ is set to 4.0, per block 220, to assure that the next image is acquired with a substantially increased exposure time.

Even if whiteness level WL passes both of the just described tests, its value may still not be within acceptable whiteness limits. In this event, the reader is directed to correction blocks 225 and 230, which set the value of $K_{CORR}$ equal to the result of the calculations shown therein. The variables shown for this ratio calculation, WL and WT, are the same as those mentioned previously for block 130 of FIG. 2. The calculation itself is structured so that the final value of $K_{CORR}$ serves as a scaling factor that causes the new exposure time value to quickly assume the value that represents the then best estimate of what an acceptable exposure time will be. If desired, a damping coefficient $K_{DAMP}$ may be included to assure that the exposure time approaches its final value without overshooting or hunting.

Whichever of correction blocks 205, 220 or 225 and 230 are selected, the result is a correction coefficient value which is immediately used as a scaling factor to calculate a new exposure time value, as called for by block 210. This new exposure time is then set into the reader, as called for by block 142, and is used for subsequent image acquisition events, unless further changed as a result of further executions of subroutine 140.

Because the exposure time of the image sensor can be changed by a relatively large amount during each pass through exposure adjustment routine 140, any necessary adjustment in exposure time will ordinarily be completed in a relatively small number of executions thereof. Once the adjustment has been completed, and an acceptable exposure time value is put into effect, the test imposed by block 135 will ordinarily be passed routinely (until illuminating conditions change) and therefore cause little delay in the completion of subsequent acquisition events. Moreover, once the latter occurs, the only remaining source of delay in start of decoding is the ability of the user to take advantage of the real time feedback signal of the invention to quickly achieve an acceptable degree of focus. These time savings, together with the time saved by the avoidance of attempts to decode marginally decodable data, assures that the practice of the present invention allows a reader to achieve a higher overall data throughput rate than is possible with focus and exposure control adjustment methods known prior to the present invention.

What is claimed is:

1. A method for determining the degree of focus in an optical reader of the type including an image sensor for generating an electrical signal including a plurality of data elements which together define an image of a target object projected thereon, a data memory for storing the gray scale values of the data elements of said image in a suitable address space, and a control circuit for controlling said image sensor and said data memory, including the steps of:
   (a) selecting, from said address space, a set of sampling addresses for use in sampling said gray scale values;
   (b) determining, for a plurality of pairs of proximately located ones of said set of sampling addresses, the gray scale values stored at said pairs of sampling addresses;
   (c) deriving, from the gray scale values stored at said pairs of sampling addresses, a focus metric signal indicative of the sharpness of the image on said image sensor; and
   (d) using said focus metric signal to generate, substantially in real time, an output signal having a user perceptible property that varies in accordance with said focus metric signal.

2. The method of claim 1 in which using step (d) includes the steps of determining the difference between the magnitude of said focus metric signal and the magnitude of a focus reference signal indicative of an in-focus condition, and varying a user perceptible property of said output signal in accordance with said magnitude difference.

3. The method of claim 2 in which said output signal is an audible ticking signal, and in which said user perceptible property is the tick rate of said ticking signal.

4. The method of claim 3 in which said tick rate has a maximum value when the magnitudes of said focus metric signal and said focus reference signal are equal, and in which said tick rate deviates from said maximum value as the difference between said focus metric signal and said focus reference signal increases.

5. The method of claim 2 in which said output signal is a blinking light, and in which said user perceptible property is the blink rate of said blinking light.

6. The method of claim 1 in which selecting step (a) includes the step of defining a sampling pattern that extends over at least a predetermined part of the address space that corresponds to the central region of the field of view of said image sensor.

7. The method of claim 6 in which said proximately located pairs of sampling addresses define sampling intervals for use in determining the sharpness of image data transitions associated with said intervals.

8. The method of claim 7 in which the sharpness of said transitions is determined from differences in the gray scale values of the data elements corresponding to said proximately located pairs of sampling addresses.

9. The method of claim 8 in which said sampling intervals are separated by non sampling intervals to reduce the time necessary to sample and determine the difference between said gray scale values in accordance with said sampling pattern.

10. The method of claim 8 in which said deriving step comprises the step of storing a predetermined number of the highest magnitude ones of said differences, and using said differences to generate said focus metric signal.

11. The method of claim 10 in which said deriving step includes the further step of generating an image contrast value from the gray scale values encountered during the sampling of said stored values in accordance with said sampling pattern and using said image contrast value to determine the magnitude of said focus metric signal.

12. The method of claim 11 in which said image contrast value is generated from the highest and lowest gray scale values encountered during said sampling and is used to normalize said highest magnitude differences.

13. The method of claim 7 in which the sharpness of said transitions is determined by the steps of defining lines that join the gray scale values at said proximately located pairs of sampling addresses, determining the slopes of said lines and calculating a sharpness value from the magnitudes of said slopes.

14. The method of claim 13 including the further steps of calculating an image contrast value from said gray scale values, and using said image contrast value to normalize said slopes prior to calculating said sharpness value.

15. The method of claim 1 further including the steps of storing a minimum acceptable value for said focus metric signal, comparing said focus metric signal to said minimum acceptable value, and taking and storing a new image of said target object if said focus metric signal falls below said minimum acceptable value.

16. The method of claim 1 including the steps of storing a minimum acceptable value for said focus metric signal, comparing said focus metric signal to said minimum acceptable value, and varying said user perceptible property in accordance with the difference between said focus metric signal and said minimum acceptable value.

17. The method of claim 1 including the step of performing, in conjunction with said determining step, the further steps of storing a representation of the distribution of the gray scale values of the image data elements stored at said sampling addresses, and deriving from said distribution a whiteness metric signal for use in adjusting the exposure time of said image sensor.

18. The method of claim 17 in which said distribution is a histographic distribution.

19. The method of claim 18 in which said whiteness metric signal is derived from said histographic distribution by integration.

20. The method of claim 17 including the further step of establishing maximum and minimum acceptable whiteness values for said whiteness metric signal, comparing said whiteness metric signal to said maximum and minimum acceptable whiteness values, and storing a new image of said target object if said whiteness metric signal does not fall between said maximum and minimum acceptable whiteness values.

21. The method of claim 20 including, if said whiteness metric signal does not fall between said maximum and minimum acceptable whiteness values, the step of adjusting the exposure time of said image sensor before performing said storing step.

22. The method of claim 1 including the further steps of generating, from gray scale values stored at said sampling addresses, a whiteness metric signal indicative of the illumination level of said target object, establishing maximum and minimum acceptable whiteness values for said whiteness metric signal, comparing said whiteness metric signal to said maximum and minimum acceptable whiteness values, and storing a new image of said target object if said whiteness metric signal does not fall between said maximum and minimum acceptable whiteness values.

23. The method of claim 22 including the further step of initiating the decoding of said image data when said focus metric signal exceeds a predetermined focus acceptability threshold, and said whiteness metric signal is between said maximum and minimum acceptable whiteness values.

24. The method of claim 23 including the further steps of establishing a time limit for the attainment of acceptable focus metric and whiteness metric signal values, and initiating the decoding of said image data if decoding has not been initiated before said time limit expires.

25. The method of claim 1 in which said output signal is a two-state signal, one state of said two-state signal indicating an acceptable focus condition and the other state of said two-state signal indicating an unacceptable focus condition.

26. A method for determining the degree of focus in an optical reader of the type including an image sensor for generating an electrical signal including gray scale values for a plurality of pixels which together define an image of the target object projected thereon, a data memory for storing said gray scale values at respective addresses of said data memory, and a control circuit for controlling said image sensor and said data memory, including the steps of:

(a) establishing a sampling pattern defining the addresses of predetermined ones of said pixels;

(b) selecting, from among the addresses of said sampling pattern, a plurality of sampling addresses for use in sampling the transitions of said image;

(c) reading from said memory the gray scale values stored at said plurality of sampling addresses;

(d) determining, from gray scale values read from said plurality of sampling addresses, the approximate slopes of those transitions of said image which correspond to said sampling addresses;

(e) generating from said slopes a degree of focus signal indicative of the degree to which the position of said reader approximates its in-focus distance from said target object; and (f) generating from said degree of focus signal, substantially instantaneously, a user perceptible signal for use in moving said reader toward said in-focus distance.

27. The method of claim 26 in which generating step (f) comprises the steps of calculating the difference between the magnitude of said degree of focus signal and the magnitude of a focus reference signal indicative of said in-focus distance, and converting said difference to a user perceptible signal.

28. The method of claim 27 in which said user perceptible signal is an audio frequency signal.

29. The method of claim 28 in which said audio frequency signal is a ticking signal and in which said converting step comprises the varying of the tick rate of said ticking signal in accordance with said difference.

30. The method of claim 29 in which said tick rate has an extreme value when the magnitude of said degree of focus signal is equal to the magnitude of said focus reference signal.

31. The method of claim 27 in which said user perceptible signal is visually perceptible signal.

32. The method of claim 31 in which said visually perceptible signal is a blinking light, and in which said converting step comprises the step of varying the blink rate of said blinking light in accordance with said difference.

33. The method of claim 26 in which said user perceptible signal is a two state signal, one state of said two-state signal indicating that the distance between said reader and said target object is an acceptable approximation of said in-focus distance and the other state of said two-state signal indicating that the distance between said reader and said target object is not an acceptable approximation of said in-focus distance.

34. The method of claim 26 in which said establishing step comprises the step of defining a sampling pattern that includes addresses that correspond to the central portion of the field of view of said image sensor.

35. The method of claim 26 in which said slopes are determined from the differences between the gray scale values stored at said sampling addresses and the gray scale values stored at respective proximately located addresses.

36. The method of claim 26 in which said slopes are determined by approximating, for each of said sampling addresses, the first derivatives of said gray scale values as a function of the location thereof.

37. The method of claim 26 in which generating step (e) comprises storing a predetermined number the highest magnitude ones of said slopes, and using said highest magnitude slopes to calculate said degree of focus signal.

38. The method of claim 37 in which generating step (e) includes the steps of generating an image contrast signal that varies in accordance with the difference between the highest and lowest gray scale values occurring during the addressing of said memory in accordance with said sampling pattern, and using said image contrast signal in the calculation of said degree of focus signal.

39. The method of claim 38 in which generating step (e) includes the step of using said image contrast signal to normalize the magnitude of said degree of focus signal.

40. The method of claim 26 further including the steps of storing a minimum acceptable value for said degree of focus signal, comparing said degree of focus signal to said minimum acceptable value, and storing a new image of the target object if said degree of focus signal does not exceed said minimum acceptable value.

41. The method of claim 26 further including the steps of storing a minimum acceptable value for said degree of focus signal, comparing said degree of focus signal to said minimum acceptable value, and generating said user perceptible signal in accordance with the difference between said degree of focus signal and said minimum acceptable value.

42. The method of claim 26 including the further step of storing a representation of the distribution of the gray scale values produced when said memory is addressed in accordance with said sampling pattern, and deriving from said distribution a whiteness signal for evaluating the exposure said target object image.

43. The method of claim 42 in which said distribution is a histographic distribution.

44. The method of claim 43 in which said whiteness signal corresponds to a predetermined fraction of the area of said histogram.

45. The method of claim 42 including the further step of establishing maximum and minimum acceptable whiteness values for said whiteness signal, comparing said whiteness signal to said maximum and minimum acceptable whiteness values, and storing a new image of the target object if said whiteness signal does not fall between said maximum and minimum acceptable whiteness values.

46. The method of claim 45 including the step of adjusting the exposure time of said image sensor if said whiteness signal does not fall between said maximum and minimum acceptable whiteness values.

47. The method of claim 40 including the further step of generating, from the gray scale values stored in accordance with said sampling pattern, a whiteness signal indicative of the illumination level of said image; establishing maximum and minimum acceptable whiteness values for said whiteness signal, comparing said whiteness signal to said maximum and minimum acceptable whiteness values, and storing a new image of the target object if said whiteness signal does not fall between said maximum and minimum acceptable whiteness values.

48. The method of claim 26 including the further step of generating, from the gray scale values stored in accordance with said sampling pattern, a whiteness signal indicative of the illumination level of said image; establishing maximum and minimum acceptable whiteness values for said whiteness signal, comparing said whiteness signal to said maximum and minimum acceptable whiteness values, and storing a new image of the target object if said whiteness signal does not fall between said maximum and minimum acceptable whiteness values.

49. The method of claim 45 including the further step of initiating the decoding of image data stored in said data memory when said degree of focus signal and said whiteness signal both have acceptable values.

50. The method of claim 49 including the further steps of establishing a time limit for the attainment of an acceptable degree of focus signal and an acceptable whiteness value, and initiating the decoding of said image if decoding has not been initiated before said time limit expires.

* * * * *